Sept. 26, 1939.     H. BECKER     2,173,996
FILM-GUIDING MECHANISM
Filed Feb. 5, 1937
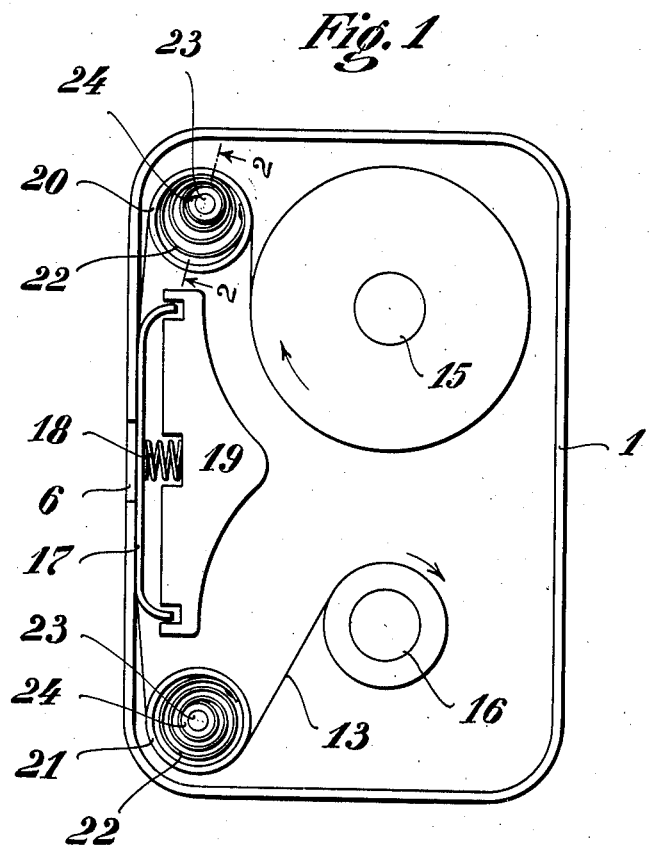
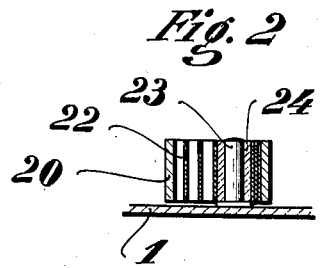
INVENTOR
*Helmut Becker*
BY
*Jvan E. A. Konigsberg*
ATTORNEY Patented Sept. 26, 1939

2,173,996

UNITED STATES PATENT OFFICE 2,173,996

FILM-GUIDING MECHANISM

Helmut Becker, Weszlar, Germany, assignor to Ernst Leitz, G. m. b. H., Wetzlar, Germany Application February 5, 1937, Serial No. 124,203 In Germany March 18, 1935

4 Claims. (Cl. 242—71)

The object of this invention is to provide improved film guiding and operating means to be used within moving picture cameras or film casettes. The film in a moving picture camera or casette runs over guide rollers which heretofore have been supported upon yielding spring pressed arms or the like in order to keep the film taut and steady in operation. Such spring arm supported rollers possess the disadvantage that they act as brakes and the arms and rollers are subject to vibrations which are communicated to the film preventing a steady movement thereof instead of assisting such movement.

It is therefore a further object of this invention to provide film guiding means for tensioning and guiding the film in such a manner that a steady even run thereof is obtained. This may be accomplished by mounting the film guiding rollers in yielding laterally radially movable relation with respect to their supporting shafts.

In the drawing accompanying this application which is a continuation-in-part of my pending application Serial Number 65,947, filed February 27, 1936, which became Patent No. 2,105,629, Jan. 18, 1938, Fig. 1 is a view of an open film casette showing the same provided with film guiding means according to this invention.

Fig. 2 is a detail sectional view of one of the film guiding rolls taken on the line 2—2 of Fig. 1.

In the drawing the reference numeral 1 denotes a film casette from which the cover or one wall has been removed in order to show the invention. The film 3 runs from a supply spool 15, past the film window 6 and thence to a winding up spool 16. The mechanism for moving the film is not shown as it forms no part of this invention. Any usual or well known film driving means may be used. The film is guided past the film window by a film guide which forms a platen 17 which is yieldingly pressed against the film by suitable means such as a spring 18 seated in the supporting member 19.

The numerals 20 and 21 designate film guide rollers around which the film is passed and guided as shown. Each guide roller contains a spiral spring 22, the outer end of which is secured to the roller while the inner end is either curled directly around the roller shaft 23 or around a loose sleeve 24 upon said shaft. During the operation the film is unwound from the spool 15, runs over the guide roller 20, past the film window 6, over the other guide roller 21 and to the winding up spool 16.

The object of the spiral springs within the film guide rollers is to cause the rollers to move laterally and radially with respect to the shafts simultaneous with the circumferential movement of the rollers which is caused by the movement of the film around the rollers. In Fig. 1 the upper roller 20 is shown as having been moved closer to the shaft 23 on the upper side thereof due to the downward pull of the film as the latter is at that moment being drawn past the film window. Because of the rotative movement of the roller the spring and the sleeve 24 rotates around the shaft 23. At this moment therefore the spring acts to cushion the inward pull of the film with respect to the shaft. The tension of the spring is such that it does not prevent the sleeve from rotating and it is immaterial for the object of this invention whether the inner end of the spring and the sleeve rotate upon the shaft, or whether the inner end of the spring is fixed to the shaft and loosely connected to the roller. This latter method of securing the spring is not shown being a mere obvious alternative. When an exposure is made the film stands still behind the film window but the spool 15 continues to rotate because of its momentum or inertia so that some film unwinds from the roll. Such unwinding of the roll will cause the loop around the guide roller 20 to be lengthened and this in turn will impart undesirable vibrations or flopping of the film. The spiral spring within the roller compensates for such increase in the film loop in that the spring moves the roller laterally radially outwardly with respect to the shaft 23. The spring acts like a rotating expanding cushion and therefore causes the roller to be shifted away from the shaft to take up the additional unwound film from the spool 15. The spiral spring within the other guide roller 21 functions of course to the same effect.

It has been found that by mounting the film guide rollers in yielding laterally movable relation to their axis the film is at all times kept taut and an even movement of the film is obtained. The effect of this construction is different from that heretofore obtained by mounting the guide rollers on swingable spring pressed arms which are subject to vibrations per se which in turn do not assist in imparting an even run to the film but are apt to oppose it and exert a braking effect.

In the present disclosure the spiral springs are not intended to, nor do they function to retard or accelerate the circumferential movement of the rollers because such action would not cause any eccentric movement of the roller with respect to the shaft, hence there would be no take up of the loops of the film and the film would not pass smoothly around the roller. The springs function as elastic cushions between the shaft and the roller and therefore partake of the rotative movement of the roller so as to yield and expand as different portions of the roller engage the film. The direction of the coiling of the springs is therefore of relatively little importance. The springs may be coiled in opposite directions as shown for balancing purposes or they may be coiled in the same direction as shown in the said Patent No. 2,105,629. In all cases however, it will be understood that the tension of the springs is so proportioned with respect to the force applied to feed the film that the springs do not act to retard the rotative movement of the film because such retardation would cause undesirable friction and wear.

While the invention is disclosed in its preferred form, nevertheless, it will be understood that it is susceptible of changes and modifications and I claim all such changes as come within the principle of the invention and the scope of the appended claims.

I claim:

1. In combination a film supply spool, a film winding up spool, rollers for guiding the film in its passage between the said spools, shafts for said rollers and means for supporting the film guide rollers upon said shafts in laterally movable yielding relation to permit said rollers to move eccentrically on their shafts for the purpose described.

2. In combination a film supply spool, a film winding up spool, rollers for guiding the film in its passage between the said spools, shafts for said rollers, and a spring between each of said rollers and its shaft for supporting said rollers in eccentrically laterally movable yielding relation to the shafts whereby said rollers remain in circumferential engagement with the film during the movements thereof.

3. A film casette having a film window, a film supply spool, a film winding up spool, rollers for guiding the film between the said spools and film window, shafts for said rollers, means yieldingly supporting the film against the film window during exposures and spiral springs within said rollers between the latter and their shafts for constantly yieldingly moving said rollers radially into engagement with the film.

4. A device according to claim 3 characterized by that the spiral springs are coiled in opposite directions as shown.

HELMUT BECKER.